July 7, 1970 R. J. ROUIS 3,518,867
FRAME AND UNIT BODY STRAIGHTENING MACHINE
Filed Feb. 1, 1967 3 Sheets-Sheet 1
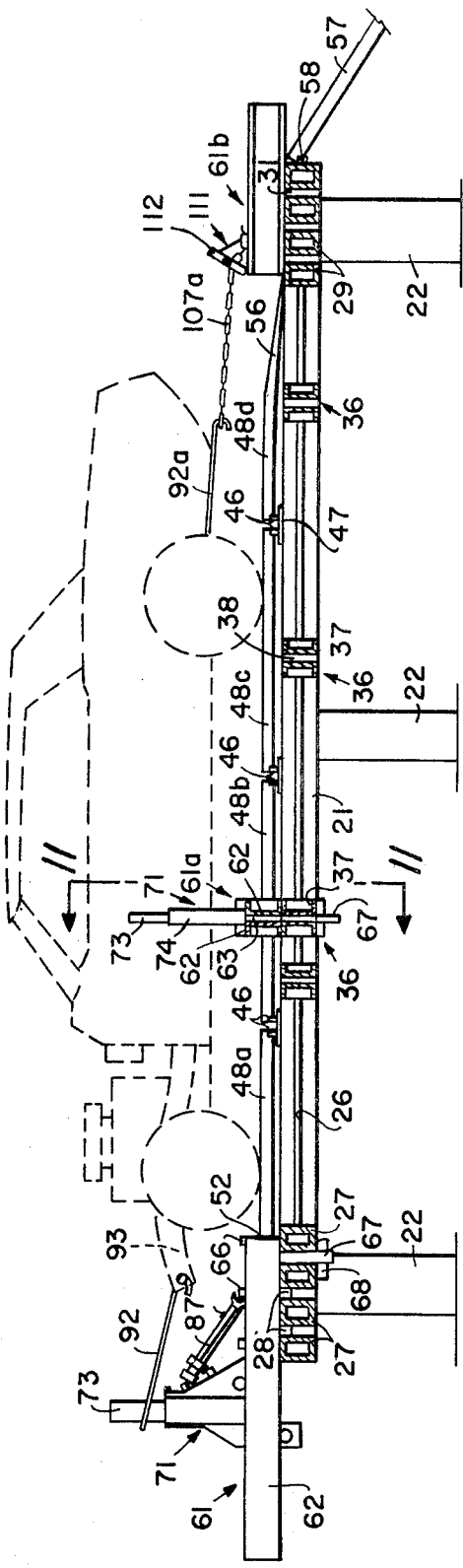
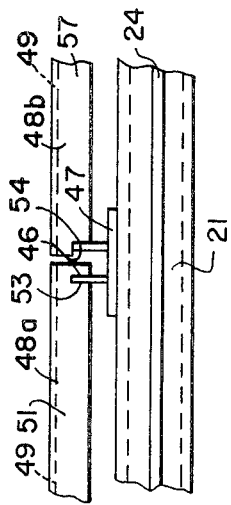
FIG. 4.
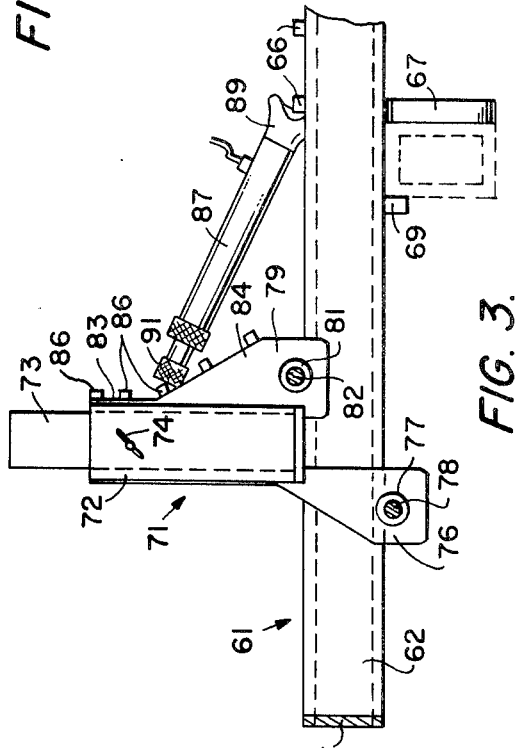
FIG. 3.
INVENTOR.
ROBERT J. ROUIS
BY Julian Caplan
ATTORNEY July 7, 1970  R. J. ROUIS  3,518,867
FRAME AND UNIT BODY STRAIGHTENING MACHINE
Filed Feb. 1, 1967  3 Sheets-Sheet 2
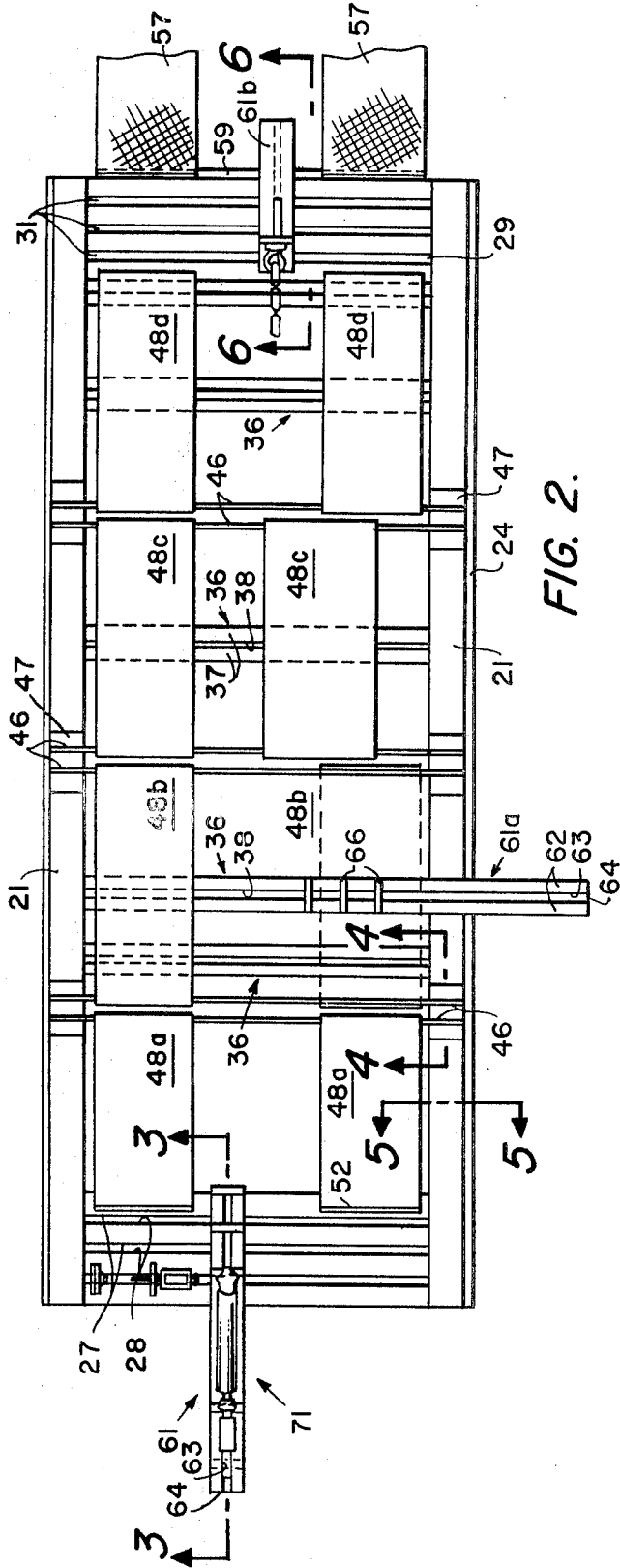
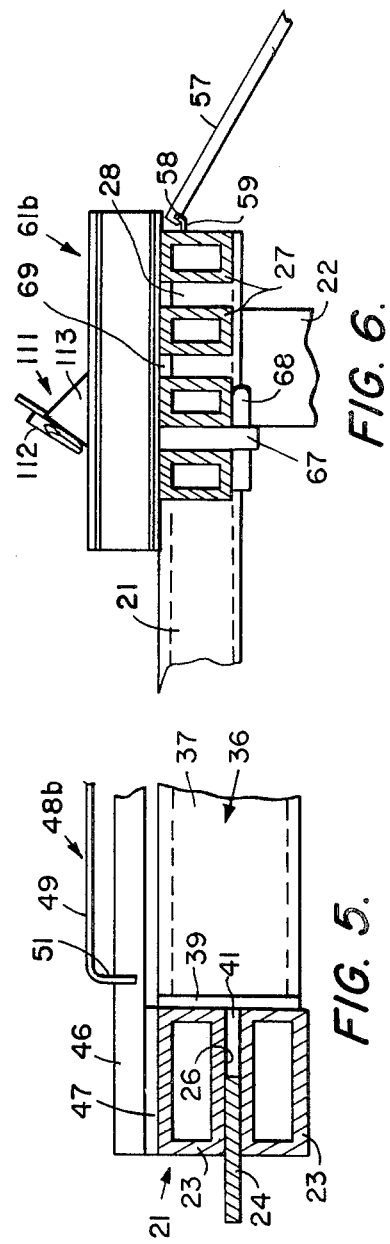
INVENTOR.
ROBERT J. ROUIS
BY Julian Caplan
ATTORNEY July 7, 1970 R. J. ROUIS 3,518,867
FRAME AND UNIT BODY STRAIGHTENING MACHINE
Filed Feb. 1, 1967 3 Sheets-Sheet 3

INVENTOR.
ROBERT J. ROUIS
BY
ATTORNEY

United States Patent Office 3,518,867
Patented July 7, 1970

3,518,867
FRAME AND UNIT BODY STRAIGHTENING MACHINE
Robert J. Rouis, San Mateo, Calif. (% Align Rite Inc., 2277 Shafter Ave., San Francisco, Calif. 94124)
Filed Feb. 1, 1967, Ser. No. 613,274
Int. Cl. B21d *3/12*
U.S. Cl. 72—389                      5 Claims

ABSTRACT OF THE DISCLOSURE

A flat, rigid base frame comprises longitudinal side rails fixed to front and rear ends, the latter being formed with multiple transverse vertical slots. The side rails are formed with inward facing horizontal slots used to support the ends of transverse horizontal rails, which are longitudinally movable in the horizontal slots and also transversely vertically slotted. Transverse supports are provided for longitudinal tread sections which support the vehicle wheels and are transversely slidable and also removable to adjust for wheel width and to improve access to the work. Fittings inserted in the vertical slots in the front and rear ends and in the transverse rails are connected to automotive frame or body locations by hooks or other means. Attachments may be connected to the frame to receive fittings at locations laterally or longitudinally displaced relative to the base frame. Hydraulic power applied to the fittings thereby applies longitudinal and transverse forces to the automotive frame, the construction of the base frame, attachments, and fittings achieving versatility in such force applications. Further, vertical forces may be applied at the front and rear ends and at the transverse rails in the various positions of their longitudinal adjustment.

---

A principal advantage of the present invention, as contrasted with other frame straightening machines, is the versatility in the application of forces to the automotive frame or body unit being straightened both with respect to the directions of force application and the locations thereof relative to the machine frame. Thus, longitudinal fore and aft forces may be applied at the front or rear of the machine, or at intermediate positions, and such forces may be applied at any position on the machine in a transverse sense.

In addition to longitudinal forces, transverse inward and outward forces may be applied at the front, at the rear, and at a plurality of infinitely adjustable positions along the length of the machine.

Such longitudinal and transverse forces may be applied within the limits of the base, or may be applied laterally outward of the base by the use of sideward extending extensions, or longitudinally beyond the base by longitudinal extensions.

Vertical forces may be applied to the automotive frame at the rear and front and along the sides of the base, and also in infinitely variable positions longitudinally and laterally of the machine.

In addition to the foregoing force applications, an important feature of the machine is the fact that combinations of such forces may be applied to the vehicle frame simultaneously or sequentially.

Another feature of the invention is the fact that treads for the vehicle wheels are mounted on the frame independently of the base side rails. The treads may be adjusted laterally for different wheel spacings so that vehicles of a variety of types may be positioned on the machine. Once the vehicle is so positioned, many of the tread sections may be shifted laterally or even removed to improve access to the work.

Fittings may be located at various positions, cooperable with slots in the various frame and transverse rail members and hooked or otherwise attached to the vehicle or unit body in a variety of positions. By moving the fittings, straight pulls or pushes, or angular forces may be applied to the vehicle frame. Such movements of the fittings are accomplished with minimal frictional resistance. A principal advantage of the invention is the variety of positions and directions of application of such forces.

Another feature of the invention is the provision of means for attachment of hold-down chains to the vehicle frame at various positions of the machine frame and the facility with which chains may be installed and removed.

Other advantages of the invention reside in the increase in the speed of the frame straightening operations and the reduction in labor cost achieved thereby, and further in improvement in the variety and quality of work which the machine may accomplish, as contrasted with previous machines of this general type.

Other objects of the present invention will become apparent upon reading the following specifications and referring to the accompanying drawings in which similar characters of reference represent corresponding parts in each of the several views.

In the drawings:

FIG. 1 is a longitudinal, vertical sectional view through the machine, showing typical force applications.

FIG. 2 is a top plan thereof.

FIG. 3 is an enlarged fragmentary view of a fitting installed in an extension member as viewed substantially along the line 3—3 of FIG. 2.

FIG. 4 is a fragmentary sectional view taken substantially along the line 4—4 of FIG. 2.

FIG. 5 is a fragmentary sectional view taken substantially along the line 5—5 of FIG. 2.

FIG. 6 is a fragmentary sectional view taken substantially along the line 6—6 of FIG. 2.

MACHINE FRAME

Figure 7:
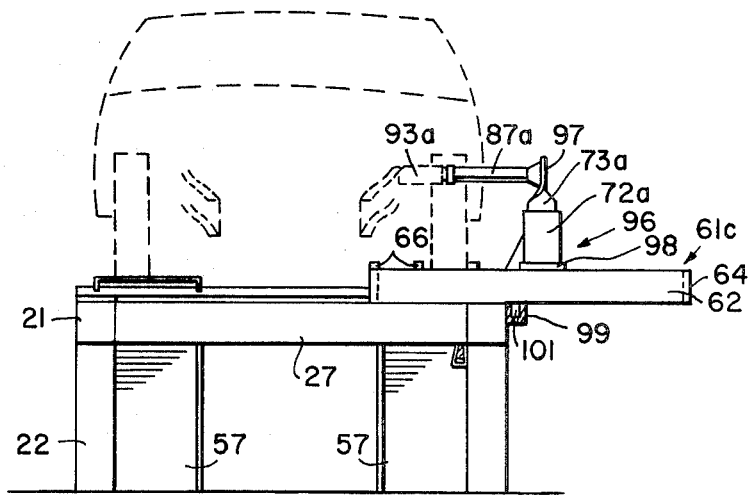
FIG. 7 is a front elevation of the machine.

The machine frame or base comprises a massive, rigid structure of a length and a width substantially greater than that of the vehicles with which the machine is used. On either side is a longitudinal, horizontal side rail 21, supported above the ground at various locations by legs 22. As best shown in FIG. 5, side rail 21 may be fabricated by welding together two sections of rectangular tubing 23, spaced apart by a horizontal longitudinal spacer plate 24, thereby establishing an inward facing horizontal slot 26, extending longitudinally substantially the entire length of the machine. At the front end of the machine are four horizontal transverse members 27, each preferably formed of rectangular or square tubing and spaced apart longitudinally of the machine to provide three transverse vertical slots 28. At the rear of the machine are four transverse horizontal members 29, which are likewise spaced apart to provide three transverse vertical slots 31. The ends of members 27 and 29 are welded to rails 21. Preferably the top surfaces of rails 21 and members 27 and 29 are coplanar and horizontal and thus comprise a reference table for the work to be performed on the vehicle.

A plurality of transverse rails 36 is provided, said rails being longitudinally slidable relative to the frame. The construction of rails 36 is subject to some variation, but as shown in the accompanying drawings said rails are formed of a pair of oppositely outward facing channels 37, the ends of which are welded to vertical plates 39 spaced apart to provide transverse vertical slots 38, from which extend horizontal transverse tongues 41, fitting in slots 26. Tongues 41 slide in slots 26 to provide for longitudinal movement of rails 36. Rails 36 may assume angles relative to the side rails 21 where required by reason of the nature of the work being performed.

WHEEL TREADS

As best shown in FIG. 1, at three locations spaced longitudinally are pairs of horizontal transverse tread support bars 46, which are longitudinally spaced apart and elevated above rails 21 by pads 47 which are welded to the rails 21 and to the bars 46.

On either side of the machine are four tread sections 48a, 48b, 48c, 48d which are generally similar but differ slightly in details of construction. Each tread section 48 has a top horizontal surface 49 and downturned longitudinal side edges 51. The forward tread section 48a at its front end has a vertical stop 52, which limits forward movement of the vehicle. At its rearward end (see FIG. 4) tread section 48a is formed with a notch 53, into which fits one of the tread-support bars 46, thereby limiting longitudinal movement of section 48a.

Sections 48b and 48c are substantially identical and at their ends are formed with notched-out corners 54 to receive one of the bars 46. The positioning of bars 46 at either end of members 48b and 48c restricts the longitudinal movement thereof. Rearmost section 48d at its forward ends is formed with a notch (not shown) similar to the notch 53, and which receives the rearmost bar 46 and thus limits longitudinal movement of section 48d. The rearward end of section 48d, as indicated by reference numeral 56, slants downward-rearward to the level of the top of rear transverse members 29.

At the back of the machine is a ramp section 57, which slants rearward to the floor. The front end of section 57 is formed with a notch 58 which engages an upturned lip 59 on the rearmost member 27 to restrict longitudinal movement.

Members 48 and ramps 57 may be shifted transversely relative to the base by sliding on bars 46 or lip 59, thereby accommodating different vehicle wheel widths. Further, the sections may be moved out of the way by sliding transversely (see section 48c in FIG. 2) or by outright removal (see section 48b). Thus access to various locations in the work is achieved. It is also important to note that the tread sections 48 are independent of the rails 21, thereby differing from other machines of this general class and considerably improving the versatility of the machine.

When the treads and ramp are in place, spaced a proper distance depending upon the distance between the wheels of the vehicle, the vehicle may be driven up the ramps 57 over the table-like surface provided by the tops of members 29, onto the ramp 48d and thence sequentially to the front where the forward progress is stopped by plate 52. The longitudinal movement due to reaction to stopping and starting the vehicle is resisted by the means of attachment of the various members 48 to their supporting bars 46. It will further be understood that if the vehicle is not in operating condition, it may be pushed onto the treads or a winch (not shown) may be used to pull the vehicle in place. Blocks may be placed behind and in front of the vehicle wheels to restrain movement of the vehicle, or various hold-down chains may be used, as hereinafter described in detail.

ATTACHMENTS AND FITTINGS

Figure 9:
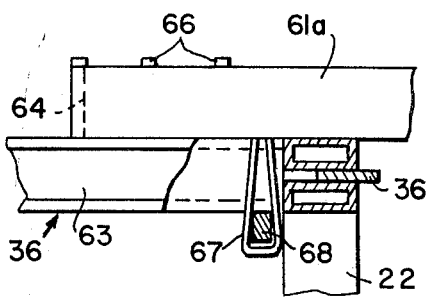
FIG. 9 is a fragmentary view, partly broken away in section, showing attachment of an extension to a portion of the frame.

Extensions 61, 61a, 61b, 61c may be used positioned either longitudinally or laterally of the frame 21. Extension 61a comprises a pair of oppositely-outwardly facing channels 62 of any desired length with their adjacent webs spaced apart to provide a transverse vertical slot 63 of a width corresponding to the width of slot 38. Plates 64 at either end hold the channels 62 in position. Abutments 66 extend across one end of extension 61 for a purpose which hereinafter appears. One means of attachment of extension 61 to the frame is shown in FIG. 9. Thus an inverted U-shaped strap 67 is secured to the underside of member 61 and has a length to extend through the slots 26, 28 or 31 and project therebelow. A wedge 68 is driven through the strap 67 below member 27, 29 or 36 and holds the extension in place. Further to secure the extension in place (see FIG. 6) a rectangular block 69 may be secured to the bottom of extension 61 to fit into one of the slots 28, or 31. The extension 61 is shown projecting forwardly at the front of the machine, extension 61a is shown projecting laterally from approximately the middle of the side of the frame, extension 61b is shown attached at the back extending longitudinally, as shown in FIG. 7, extension 61c is shown extending laterally at the back.

In FIG. 3 a sliding attachment 71 is shown in conjunction with extension 61. Attachment 71 has a vertical rectangular socket-forming portion 72 which receives a vertically slidable bar 73 which is held in various positions of adjustment by set screw 74. Extending below portion 72 and through the slot 63 is leg 76 which is fitted with a roller bearing 77 and rotatably secures a stubshaft 78. Shaft 78 fits under the bottom of channels 62. On the opposite side of socket-forming member 72 and above extension 61 is a top leg 79 which also is provided with a bearing 81 and a top stub shaft 82 fitting on top of channels 62. The readily rotatable shafts 78 and 82 riding on the bottom and top of extension 61, respectively, facilitates sliding movement of attachment 71 lengthwise of extension 61. The upper end 83 of socket-forming portion 72 is substantially vertical and therebelow is a slanted surface 84 of leg 79. At intervals on edges 83, 84 are abutments 86. Hydraulically extensible cylinders 87 are provided with bifurcated ends 89 which fit against one of the abutments 66. The rod end 91 fits against one of the abutments 86. When hydraulic pressure is applied in cylinder 87, the rod end 91 moves outward pushing the sliding attachment 71 to the left as viewed in FIG. 3. Directing attention to FIG. 1, a double hook 92 at one end fits around bar 73 and at its other end is hooked to a portion of the frame indicated by reference numeral 93 of the vehicle. As the rod end 91 projects, a pull is exerted on frame member 93 tending to straighten the same. It will be noted that bar 73 is vertically adjustable and also that the hook 92 may be fastened thereto at various elevations so that an upward, or a directly horizontal, or a downward pull may be exerted on the frame portion 93 depending upon the straightening operation required.

Directing attention to FIG. 7, a stationary attachment 96 is shown. Such attachment has a socket-forming portion 72a in which slides a bar 73a. Bar 73a may be the same as bar 73 shown in FIG. 3, but as shown in FIG. 7 the bar is twisted approximately midway of its length so that its upper end 97 is turned 90° relative to the lower end. Attachment 96 has a pad 98 which rests on top of extension 61c and it also has a lower leg 99 which fits through the slot in extension 61c and is provided with a square or rectangular hole 101 below extension 61c. A wedge (not shown, but similar to wedge 68) may be driven through hole 101 to hold attachment 96 in position longitudinally of extension 61c. In the operation illustrated in FIG. 7, a hydraulic cylinder 87a is positioned between the upper end 97 of bar 73a and a frame member 93a to be straightened.

Figure 8:
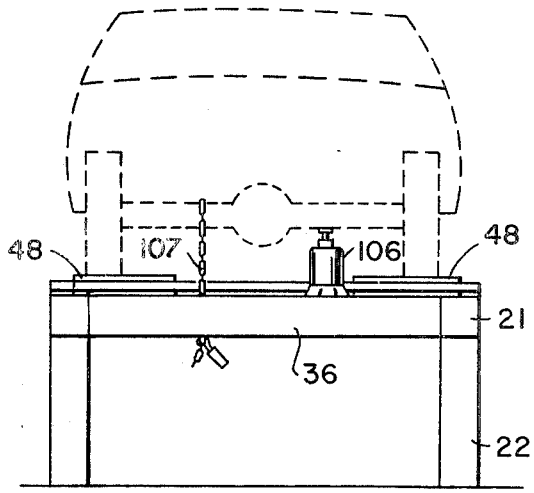
FIG. 8 is a rear elevation thereof.
Figure 10:
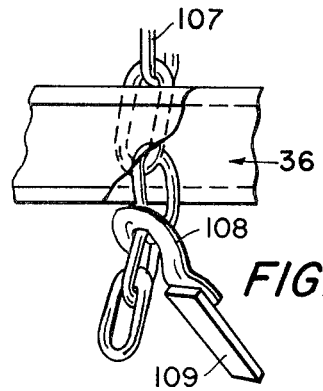
FIG. 10 is a fragmentary view partly broken away in section showing a means for fixing a hold-down chain relative to a frame member.

FIG. 8 illustrates application of a vertical force. A jack 106 is positioned on one of the transverse rails 36 and in this connection the longitudinal slidability of said rails is important since the rail can be positioned directly under the spot where the work is performed. To hold down the frame, chain 107 is placed around or hooked to a portion of the vehicle, such as the rear axle shown in FIG. 8. The end of the chain 106 fits through the slot 38 in rail 36 and extends below the rail. A hook 108 is hooked into the chain as best shown in FIG. 10 and bears against the underside of rail 36 when lifting pressure is applied and thus holds the chain down. The weighted end 109 of hook 108 causes the part to assume the position shown in FIG. 10 and thus prevents unintentional disengagement of the hook from the chain.

Extension 61b shown in FIGS. 1, 2 and 6 is provided on its upper surface with a chain connector 111. This member has a pair of rearwardly-upwardly slanted bars 112 which are spaced apart a distance which is greater than the thickness but less than the width of the links of chain 107a. Gusset 113 supports bar 112. A hook 92a is hooked to a portion of the vehicle such as the rear axle at one end and to the chain 107a at the opposite end. The other end of chain 107a is passed between the bars 112 and anchored in position. Accordingly, when a forward pull is applied to the vehicle frame as by means of the sliding attachment 71 shown in FIGS. 1 and 2, the vehicle is restrained against forward movement by hook 92a, chain 107a and chain connector 111.

Figure 11:
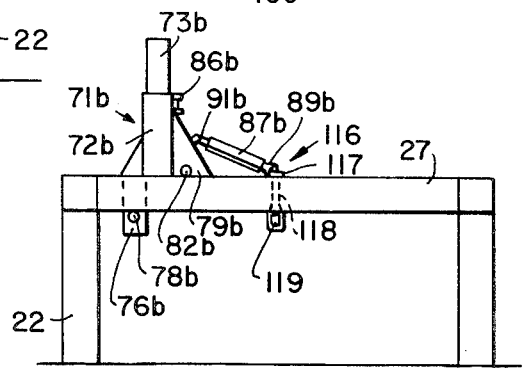
FIG. 11 is a fragmentary view of a fitting in the base frame taken substantially along line 11—11 of FIG. 1.

In FIG. 3 sliding attachment 71 is shown in combination with extension 61. In FIG. 11, a substantially identical attachment 71b is shown laterally slidable in one of the front slots 28. In other respects the elements of member 71b are substantially the same and the same reference numerals followed by subscript b are employed. To provide an abutment for the end 89b of cylinder 87b an abutment member 116 may be used. Member 116 has a block 117 resting on top of members 27 transverse of slots 28 and having an inverted U-strap 118 which extends through slot 28 and projects therebelow. Wedge 119 is driven through strap 118 below member 27 and holds abutment member 116 in place. It will be understood that instead of installing attachment 71b and member 116 in slot 28, they may be installed in any slot 26 or 31, or in a slot 63, depending on the requirements of the work.

OPERATION

Various operating features of the machine have been described in conjunction with the description of the function of parts heretofore detailed. But directing attention first to sliding attachment 71, it will be seen that when used in conjunction with forward extending extension 61, a longitudinal forward pull on the vehicle frame is exerted. Such a pull may be exerted at a plurality of positions by moving the extension 61 transversely of the machine, by raising and lowering bar 73 and by adjusting the angle of cylinder 87. Futher versatility is imparted by using different shapes and lengths of hooks 92. By using a plurality of sliding attachments, a combination of pulling forces may be imparted.

It will further be understood that the sliding attachment 71, instead of being installed on extension 61, may be installed directly in the slots 28 or 31, or likewise directly in the slots 38 without using the extension 61. In such cases, the stub shafts 78, 82 rest on top of the members 27, 29 or 37.

FIG. 7 illustrates the use of a fixed or stationary attachment 96. As shown, said attachment is used in conjunction with a laterally projecting extension 61c. However, the attachment 96 may fit through a slot 28, 31 or 63.

As is apparent from the foregoing, extensions 61 improve the versatility of the machine by enabling the forces to be applied from positions beyond the dimensions of the frame of the machine. Where the attachments are used by direct application to machine frame rather than to extensions, the pulling and pushing forces may be applied to the underside of the vehicle.

FIG. 8 is typical of a vertical force application, but is will be understood that many different forces can be applied.

Within the practical limits of the working space available and the necessities of the job to be performed, a wide variety of forces may be applied to the vehicle frame or unit body. As has been illustrated and described, longitudinal horizontal forward and rearward forces may be applied or transverse inward or outward forces. Likewise, vertically upward or downward forces may be applied. By slanting the transverse rails 36, angular forces may be applied.

Various combinations of forces may be applied to the same member. Thus a longitudinal and a lateral force may be applied, or a longitudinal and a vertical force or other combinations. Combinations of forces fore and aft and inward and outward or upward and downward also may be applied simultaneously or sequentially.

What is claimed is:

1. In a vehicle frame and unit body straightening machine, a horizontally disposed rigid base frame having front transverse members 27 at the front spaced apart to form transverse, vertical front first slots 28, rear transverse members 29 at the rear spaced apart to form transverse, vertical rear first slots 31, longitudinal side rails 21 on either side of the machine fixed to said front and rear members and formed with horizontal, longitudinal second slots 26, and support means 48 for supporting the wheels of a vehicle; the space within said rails and between said members being relatively unobstructed for access to work on said vehicle; and at least one transverse rail 36 movable relative to said frame fitting between said side rails and having protruding tongues 41 received within said horizontal second slots, said transverse rails being adjustable in position longitudinally of said frame, said side rails restraining transverse movement of said transverse rail, said transverse rail being formed with a vertical third slot 38 extending transversely of said base frame, at least one fitting 61a fitting into said third slot and movable longitudinally of said third slot, connecting means 92 for connecting said fitting to a portion of a vehicle frame or body, an abutment 66 fixed relative to said frame, and fluid actuated expansion means 87 between said abutment and said fitting for moving said fitting relative to said frame.

2. A machine according to claim 1 which further comprises a plurality of transverse horizontal bars fixed to said base frame, said support means comprising pluralities of tread sections on either side of said base frame and disposed consecutively longitudinally of said base frame, each said tread section resting on said bars, some of said tread sections notched to receive said bars and restrained by said bars against longitudinal movement, each said tread section movable transversely of said base frame independently of the other said tread sections.

3. A machine according to claim 1 in which each said extension 61, 61a is formed to fit in any of said first and third slots, said extension projecting beyond the margins of said base frame and formed with vertically disposed fourth slots 63, said extensions being selectively positioned extending longitudinally (FIG. 7) and transversely (FIG. 1) of said first slots and of said third slots, means 67 on each said extension fitting through one of said first slots, cooperating means 68 for restraining said extension against movement relative to said base frame, at least one of said fittings fitting into one of said slots and movable longitudinally of said slot (FIG. 3), and rollers 77, 81 on at least one said fitting engaging top and bottom surfaces of said extension.

4. A machine according to claim 1 in which said fitting is detachable from said transverse rail and comprises a vertical socket-forming member 72, top and bottom legs 84, 76 on said member, top and bottom stub shafts 82, 78 rotatably mounted in said top and bottom legs, said shafts parallel and horizontal and spaced relative to each other vertically and longitudinally, said top leg formed with at least one abutment 86, said member being formed with a vertically disposed socket 72 and which further comprises a bar 73 vertically adjustable in said socket.

5. A machine according to claim 4 in which said bar is twisted 90° intermediate its ends.

References Cited

UNITED STATES PATENTS

| | | | |
|---|---|---|---|
| 3,053,305 | 9/1962 | Lincourt | 72—705 |
| 3,131,748 | 5/1964 | Junkins | 72—705 |
| 3,276,237 | 10/1966 | Transue | 72—705 |
| 2,069,249 | 2/1937 | Hunt | 72—705 |
| 2,140,686 | 12/1938 | Bennett | 72—705 |
| 2,422,030 | 6/1947 | Merrill | 72—705 |
| 2,442,425 | 6/1948 | Merrill et al. | 72—705 |
| 2,442,604 | 6/1948 | Johnson et al. | 72—705 |
| 2,563,527 | 8/1951 | Gingrich et al. | 72—705 |
| 2,627,295 | 2/1953 | Jackson | 72—705 |
| 2,717,020 | 9/1955 | Dobias | 72—705 |
| 2,750,983 | 6/1956 | Rogers | 72—705 |
| 2,830,789 | 4/1958 | MacMillan | 72—705 |
| 2,836,219 | 5/1958 | Pertner | 72—705 |

CHARLES W. LANHAM, Primary Examiner

B. J. MUSTAIRIS, Assistant Examiner

U.S. Cl. X.R.

72—705